E. E. GILMORE.
OVERHEAD SWITCH FOR ELECTRIC RAILWAYS.
APPLICATION FILED SEPT. 27, 1905.

944,131.

Patented Dec. 21, 1909.
2 SHEETS—SHEET 1.

Witnesses
O. W. Edelin.
James H. Marr.

Inventor
Edward E. Gilmore
By Edward E. Clement
Attorney

E. E. GILMORE.
OVERHEAD SWITCH FOR ELECTRIC RAILWAYS.
APPLICATION FILED SEPT. 27, 1905.

944,131.

Patented Dec. 21, 1909.
2 SHEETS—SHEET 2.

Witnesses
H. Lowenstein
James H. Marr

Inventor
Edward E. Gilmore
By Edward E. Clement
Attorney

UNITED STATES PATENT OFFICE.

EDWARD E. GILMORE, OF PHILADELPHIA, PENNSYLVANIA.

OVERHEAD SWITCH FOR ELECTRIC RAILWAYS.

944,131.   Specification of Letters Patent.   Patented Dec. 21, 1909.

Application filed September 27, 1905. Serial No. 280,319.

*To all whom it may concern:*

Be it known that I, EDWARD E. GILMORE, a citizen of the United States, residing at Philadelphia, in the county of Philadelphia and State of Pennsylvania, have invented certain new and useful Improvements in Overhead Switches for Electric Railways, of which the following is a specification, reference being had therein to the accompanying drawing.

My invention relates to overhead switches for trolley systems.

The object of the invention is to provide a switch which will obviate as nearly as possible the excessive wear where single and double truck cars are used in the same system.

Heretofore short switches, where several sizes of cars are passing, could not well be used without injury to both the switch and the trolley wires, for while short cars wear away the flange of the switch, the longer cars wear out the trolley wire. The fact is that in any ordinary switch, a long car will be well upon the curve or turnout before its trolley wheel reaches the overhead switch. The car having turned, the trolley wheel is twisted on the wire and is either thrown off entirely or damages the wire. On the other hand, short cars or single truck cars have their trolley wheels too far on the switch when the car turns, with the result that the instant the car turns there is a slam, and thus wears out the flanges of the switch bodies to an extent which in large systems amounts to a very considerable figure per annum. To obviate these difficulties, I construct my switch body considerably longer than heretofore used and provide relatively long guiding arms connected to the body with removable end guides or runners secured thereto. This lengthening of the entire switch structure would, of course, produce still worse slamming by the short cars were it not for the fact that I provide means for guiding the trolley through the switch body thus preventing its slamming. This means holds the trolley until the car is on the curve, the trolley wheel then being opposite an extension of one of the guiding arms which is adapted to receive it.

Other features of the invention will be brought out in the following detailed description, to be read in connection with the accompanying drawings which form a part of this application and in which—

Figure 1:
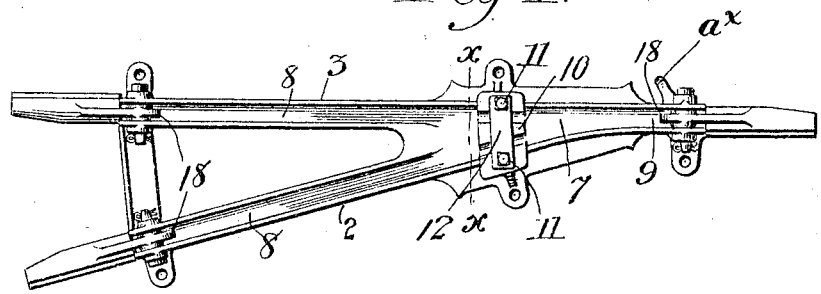
Figure 2:
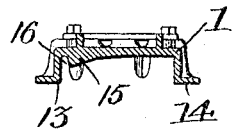
Figure 3:
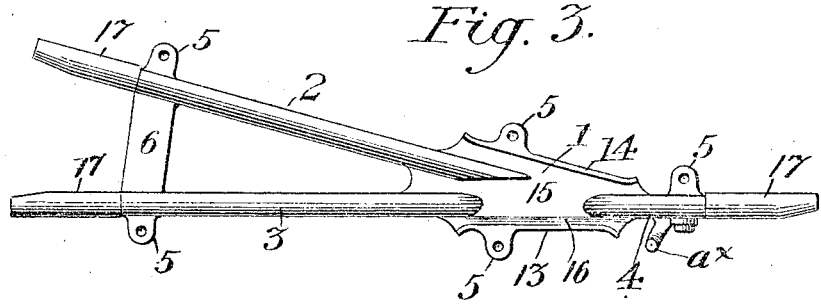
Figure 4:
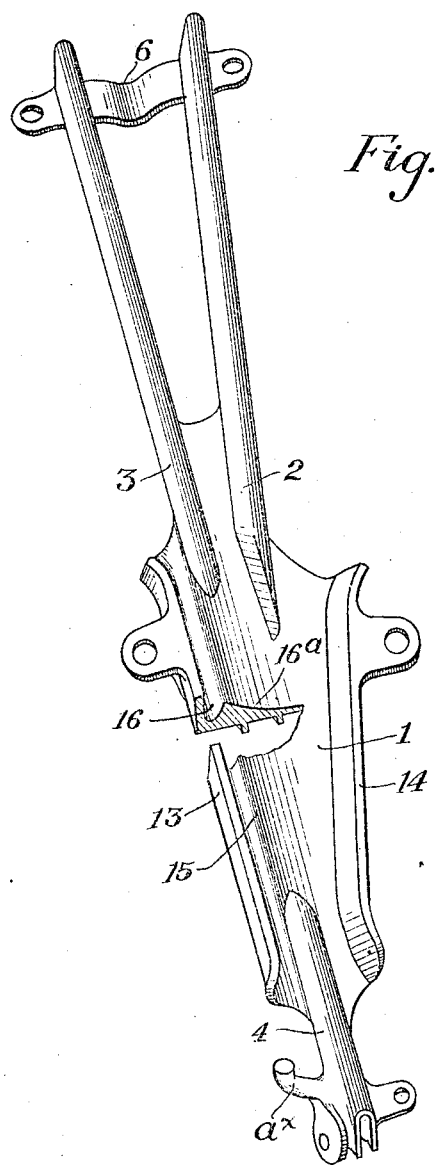

Figure 1 is a top plan of the device. Fig. 2 is an inverted sectional view on the line *x—x* of Fig. 1; and Fig. 3 is a bottom plan view. Fig. 4 is a perspective view showing the under side of the body with the guide flange in section.

Referring to the drawings, 1 represents the body of the device which, as before stated, is relatively long and provided with extended switch arms 2, 3 and 4 cast as a part of the body and provided with lugs 5 adapted to receive the guy wires for supporting the switch. The arms 2 and 3 diverge from a point near the center of the body 1 and are supported or spaced apart by a bridge 6, which, should the trolley jump the wire, would prevent the pole from jamming between the arms 2 and 3 to damage the switch, the wire, or the trolley pole. The inner end of the arm 2 projects into the body for a considerable distance where it is sheared off so as to properly engage the trolley wheel as it passes from a guide rib to be hereinafter described. In the upper portion of the body I form a groove 7 which merges into the groove 8 in the arms 2 and 3 in one direction and in the opposite direction into the groove 9 of the arm 4. This central groove 7 is divided by a lug 10 so that the trolley wire coming in on the arm 3 will pass directly to the groove 9 in the arm 4 and the wire for the turnout or curve coming in on the arm 2 will be separated therefrom. To this lug 10 is secured by bolts 11 a clamping member 12 which is adapted to secure the wires within the grooves 8 and 9.

On the under side of the switch or on the side which is engaged by the trolley wheel, the switch is provided with depending flanges 13 and 14, the former of which extends in a line with the arms 3 and 4 and the latter of which is carried off on an angle and in substantial parallelism with the arm 2 so that when a car is coming from the left to the right as viewed in the figure, the flange 14 will guide the trolley wheel to the arm 4 and out to the main wire. Between the two flanges 13 and 14 the body 1 is thickened and raised on a gradual slope to form a flange or cam 15 which, with the flange 13, defines a groove 16 extending in a line with the arms 3 and 4 so that the flange of a trolley wheel passing from right to left as viewed on the drawings, will engage the groove 16 and be prevented from slamming over from one flange to the other until the car has actually turned on the curve sufficiently far to draw the trolley pole over. The importance of this should be fully understood. Heretofore, if the guiding members 2, 3 and 4 and the length of the body were adjusted to suit the movement of the trolley on long cars, the trolley on a short car would lift the arm 4 as soon as the arm struck the turnout and would slam over against the flange 14, passing from there on to the arm 2 and causing heavy wear at the point of impact on the flange. On the other hand, if the parts be made and adjusted with reference to the short cars, the passage of a long car would produce unnecessary wear on the trolley wire and on the point of the switch where the trolley wire enters. By the combination of a long body, long guiding arms and relatively long extension runners with the flange or cam 15 and groove 16, I avoid both these difficulties. The flange of the trolley wheel as it passes off the arm 4 engages the groove 16 and the flange or cam 15 and runs upon it until the car turns far enough to throw the trolley pole, whereupon the turning of the wheel will twist it off the cam 15. At this point the wheel is in position to be engaged by the sheared end of the arm 2. This holds for either short or long cars, and it goes without saying that I make the device long enough to take both.

At the outer end of each arm 2, 3 and 4, I provide an extension runner or wear shoe 17 having a side groove adapted to communicate with the groove 8 or 9 respectively in the arms and axially displaced with relation thereto. These end runners or shoes are pivoted to the arms and are so constructed that each groove has separated flanges, the uppermost flange being the heavier and the lowermost being the lighter and wider of the two, so that it may be bent up and the trolley wire secured in the groove thereby. At the inner end of each runner there is provided an extension or cam lug 18 adapted to bear against the trolley wire and to automatically hold it depressed within the groove 8 or 9 as the case may be when the trolley wheel is in engagement with the wire, just preceding its attachment with the shoe. The trolley wheel in running upon the switch or upon the wire immediately adjacent the switch raises the end of the runner or shoe 17 and thereby automatically forces its cam extension into engagement with the trolley wire.

The arms 2 and 3 are provided with the lugs 5 and in practice the head guying wires are secured to them and to the supporting poles. The body is also similarly provided and to one side of the arm 4 I also secure a lug by which a guy wire may be attached. The opposite side of the arm 4 is provided with a hook $a^x$ which extends upwardly and outwardly and is adapted to assist in supporting the switch by its engagement with an extension of the curve wire which passes thereunder and is secured in any suitable manner to a guy wire. This feature of the invention is specifically described and claimed in a divisional application filed July 18, 1907, Serial No. 384,449, and therefore need not be more fully brought out herein.

Having thus described my invention, what I claim and desire to secure by Letters Patent is:

1. An overhead switch for electric trolley systems comprising a body having side flanges, main and branch terminals for a trolley wheel, and an intermediate flange extending between the main line terminals parallel to one side flange and shaped in section so as to leave a groove on that side, and to have a gradual slope on the other, whereby trolley wheels on the main line will be guided through the switch without a break, and wheels entering or leaving by the branch terminal will be forced to pass diagonally across the body over the said slope, without slamming.

2. An overhead switch for electric trolley systems comprising the body 1 having side flanges 13 and 14, main terminals 3 and 4, branch terminals 2, and a continuous guide rib 15, having a groove 16 on one side, and a gradual slope $16^a$ on the other, as and for the purposes intended, substantially as described.

In testimony whereof I affix my signature in presence of two witnesses.

EDWARD E. GILMORE.

Witnesses:
JAMES HEYWOOD,
DAVID M. ASHLEY.